United States Patent [19]

Lanoe et al.

[11] 3,927,375
[45] Dec. 16, 1975

[54] ELECTROMAGNETIC RADIATION DETECTOR

[76] Inventors: Bernard Lanoe; Elisabeth de Metz, both of 65, boulevard Pasteur, Bruz, France

[22] Filed: Feb. 4, 1974

[21] Appl. No.: 439,123

[30] Foreign Application Priority Data
Feb. 16, 1973 France .............................. 73.05457

[52] U.S. Cl. ................ 325/363; 40/1.5; 240/6.4 W; 340/228 R
[51] Int. Cl.² ......................................... H04B 17/00
[58] Field of Search ............ 325/149, 363, 364, 67; 340/228 R, 283; 313/499; 40/2.2, 1.5, 129 A; 250/39 HT; 240/6.4 W; 343/100 ME, 795, 703; 315/136

[56] References Cited
UNITED STATES PATENTS

| | | | |
|---|---|---|---|
| 3,109,988 | 11/1963 | Hoover | 325/364 |
| 3,216,135 | 11/1965 | Wright | 40/1.5 |
| 3,639,841 | 2/1972 | Richardson | 325/363 |
| 3,737,647 | 6/1973 | Gomi | 240/6.4 W |
| 3,783,448 | 1/1974 | Brodwin | 325/363 |

OTHER PUBLICATIONS

Turner, Transistor Circuits, Gernsback Library Inc. 1957, p. 92.

*Primary Examiner*—George H. Libman
*Attorney, Agent, or Firm*—Larson, Taylor and Hinds

[57] ABSTRACT

An electromagnetic radiation detector unit includes an alarm device responsive to voltage measurements. The detector unit includes a radiation receiving antenna, a voltage detector connected to the antenna, a threshold amplifier switch connected to the output of the voltage detector and a diode which is triggered by the amplifier switch and which serves as the alarm device. The components of the unit are carried by a printed circuit card or formed by printed circuits on the card. The card is formed as an individual badge used by the wearer in detecting electromagnetic radiation hazards and carries identity and other indicia on the face thereof.

6 Claims, 3 Drawing Figures

ELECTROMAGNETIC RADIATION DETECTOR

FIELD OF THE INVENTION

The present invention relates to electromagnetic radiation detectors and, more particularly, to an electromagnetic radiation hazard detector which can be used or worn as a badge.

BACKGROUND OF THE INVENTION

Electromagnetic radiation hazards have long been the object of numerous studies particularly in the U.S., the U.S.S.R. and France. Reference is made to the article "Possible Biological and Physiopathological Effects of UHF Electromagnetic Radiation of Radar Antennas", by R. Joly, G. Plurien, J. Drouet and B. Servantie which appeared in the journal "Corps de Sante des Armees" (Army Sanitation Corps), July 1969, Volume X, No. 3, pp. 239 to 259 and to the earlier U.S. article "Some Technical Aspects of Microwave Radiation Hazards", by W. W. Mumford, which appeared in the journal "Proceedings of the IRE", February 1961, pp. 427 to 447. Studies such as referred to have led to definitions of particular exposure levels which should not be exceeded, and, for example, in France, a level has been arrived at of 10 mw/cm² for an exposure equal to or greater than one hour.

A number of forms of electromagnetic radiation densiometers have been developed and reference is made to U.S. Pat. No. 3,182,262 for an example of such a device. The densiometer disclosed in the patent noted above includes an antenna which feeds a thermistor connected in a resistor bridge and similar densiometers are disclosed in the Mumford article referred to above (see page 443, second column). Such densiometers require considerable shielding so as to avoid the direct influence of strong magnetic fields on the other electronic circuitry of the device and because of this, such devices are bulky and heavy. For example, the volume of a typical densiometer is on the order of 400 cm³ (10 × 8 × 5 cm) and the weight is approximately 500g. In addition to the bulk and weight of thereof, these devices are relatively expensive.

Because of the disadvantages discussed above, it is not practical to issue individual densiometers to every person who is called upon to be subjected to radiation of the type discussed, either during testing of equipment or in areas such as airfields which include several radar devices or several different types of radar. Both of these situations can create hazards. With the testing of new equipment circumstances can arise or incidents occur where unexpected concentrations of radiation power are produced. Regarding areas such as airfields, while it is possible to draw up a chart of radiation densities for a particular area, such a chart is only valid as long as the radiation sources and radiation reflector devices remain in the same locations. Thus, even where radiation density charts are used radiation hazards can still exist.

SUMMARY OF THE INVENTION

In accordance with the invention, a radiation detector is provided which can be issued to an individual to be carried or worn by him, and which provides an alarm signal when that individual enters an area where the radiation density exceeds a predetermined safe level (e.g., a level less than 10 mw/cm²).

The radiation detector of the invention comprises a simple electronic circuit the dimensions of which when implemented using printed circuit techniques are such that the circuit can be contained on badge-like card of a size which can be slipped into a pocket or be pinned to the clothing. A further important feature of the invention is that the cost thereof is such that individual detectors can be issued to all concerned personnel.

In accordance with a preferred embodiment thereof, the electromagnetic radiation detector of the invention includes a radiation receiving antenna, a voltage detector connected to the antenna, a threshold amplifier switch connected to the output of the voltage detector and an electroluminescent diode which is connected to the output of the amplifier switch and serves as an alarm device. The voltage detector advantageously comprises a rectifier bridge and the receiving antenna comprises a dipole antenna, the two ends of one diagonal of the bridge being respectively connected to the radiation receiving dipole elements and the two ends of the other diagonal being respectively connected to ground and to the input of the threshold amplifier switch. The threshold amplifier switch preferably comprises a transistor connected in a common emitter configuration, a D.C. source, such as a dry cell, being connected in series with the electroluminescent diode and the collector-emitter circuit of the transistor. The base of the transistor is connected to the ungrounded, output end of the rectifier bridge through a potentiometer connected as a voltage divider.

According to a further feature of the invention, the components forming the rectifier bridge, amplifier switch and potentiometer are mounted on the back of the printed circuit card and the printed connections are located on the front thereof, the front being covered with a rigid sheet or coating having an aperture or hole therein through which the electroluminescent diode extends. The cover preferably includes identity indicia normally printed on badges as well as instructions as to the actions to be taken upon lighting of the diode.

It is noted that voltage measuring radiation detection techniques are generally reserved for radiation densities in continuous radiation situations. Thus, for pulsed radiation situations, it might be thought that certain electronic components such as the diodes of the rectifier bridge could be damaged or destroyed. This danger, which is a real one insofar as densiometers are concerned, does not apply to the radiation detector of the invention for normal use conditions. In fact, the detector of the invention functions satisfactorily for levels below 10 mw/cm², i.e., below the danger level for destruction of the diodes, even under pulsed radiation conditions.

Other features and advantages of the invention will be set forth in, or apparent from, the detailed description of a preferred embodiment found hereinbelow.

DESCRIPTION OF THE PREFERRED EMBODIMENT

Figure 1:
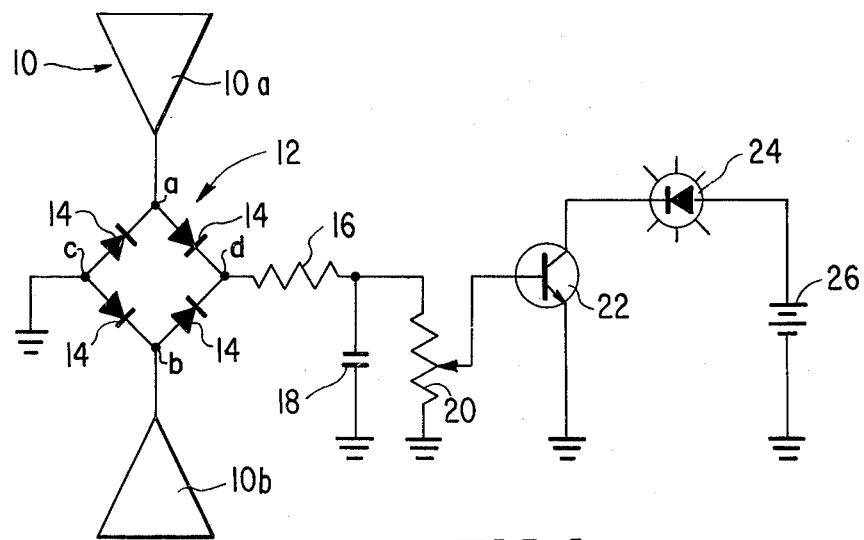
FIG. 1 is a schematic circuit diagram of the radiation detector of the invention.

Referring to FIG. 1, an apparatus in accordance with the invention includes a dipole antenna 10 including dipole arms or wave collectors 10a and 10b which receive electromagnetic wave energy from electromagnetic fields in which dipole antenna 10 is located. Dipole arms 10a and 10b can be implemented by copper layers printed on a printed circuit card or by wires of a predetermined thickness located on the periphery of such a card. In the embodiment of FIG. 1, dipole arms 10a and 10b are of a triangular shape and are arranged symmetrically with respect to junctions or junction points a and b of a first diagonal of a rectifier bridge 12 formed by four diodes 14. Junction points a and b are respectively connected to dipole pins 10a and 10b through printed conductors.

Considering the remaining two junctions of bridge 12, junction c is connected to ground while the opposed junction d is connected to the input of a filter formed of a series resistor 16 and a shunt capacitor 18, the latter of which, in a simplified embodiment, comprise a residual capacitance. Bridge 10 rectifies the voltage appearing at junctions c and d and the filter formed by resistor 16 and capacitor 18 filters this voltage so that a D.C. voltage appears at point e. This voltage is connected through a potentiometer 20 to the base of an NPN transistor 22 connected in a grounded or common emitter configuration. Transistor 22 acts as an electronic threshold amplifier switch and the switching threshold thereof is defined by the position of the tap of potentiometer 22.

The collector of transistor 22 is connected to the input terminal of an electroluminescent diode 24 whose output terminal is connected to the positive plate or pole of a dry cell or battery 26. The negative plate of dry cell 26 is connected to ground.

In operation, when the level of radiation received by antenna 10 is such that the resultant D.C. voltage at point e triggers transistor 22, diode 24 is energized, i.e., lights up and emits a red light. Potentiometer 20 enables the level of radiation at which switching of transistor 22 occurs to be adjusted to the level at which an alarm signal is to be produced. On the other hand, dry cell 26 does not generate current until the selected threshold is exceeded so as to ensure long life of the cell.

Figure 2:
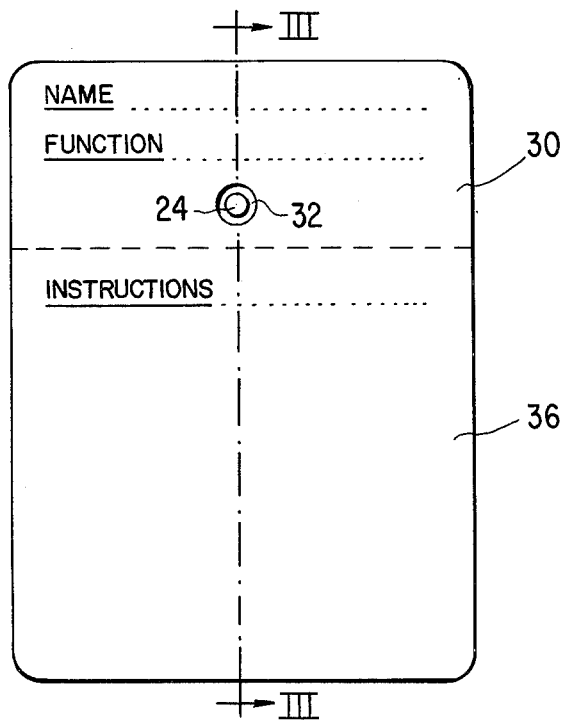
FIG. 2 is a front elevational view of a badge incorporating the detector of the invention.
Figure 3:
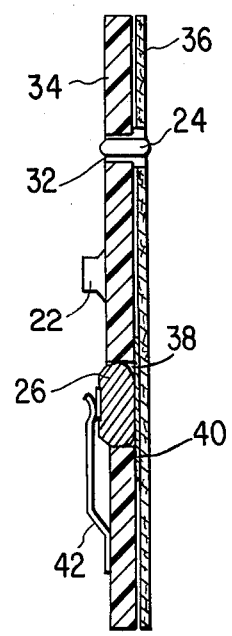
FIG. 3 is a section taken along line III—III of FIG. 2.

Referring to FIGS. 2 and 3, a badge is shown which incorporates or carries the circuit of FIG. 1 utilizing printed circuit techniques. As illustrated in FIG. 2, the upper portion of the badge, which is denoted 30 and which resembles badges in common use in the atomic energy industry, is reserved for details regarding identity (name) and work identification (function). The diode 24 extends through a hole 32 in the badge which lies beneath these markings as shown and is located relatively high on the badge so that the diode 24 may be seen even where the badge is placed in one's pocket. The lower half of the badge can contain instructions in the event of lighting of diode 24.

As shown in FIG. 3, the badge includes a printed circuit card 34 which is covered with a thin sheet of cardboard 36. Card 34 includes a recess or hole 38 in which dry cell 26 is mounted and dry cell 26 can be a miniature cell of type that is readily available on the market. A plate 40, which is soldered to printed circuit card, closes hole 38 and ensures grounding of cell 26 while a spring 42 biasses cell 26 into hole 38 so that cell 26 can be readily replaced. As illustrated, hole 32 extends through card 34 and cover 36, and the edges of hole 32 may be blackened to make the light produced by diode 24 more visible. Transistor 22 is mounted on the back of card 34 as shown while the various printed connections (which are not shown in FIGS. 2 and 3) are located on the front.

Testing on a model of the device of the invention utilizing commercially available components produces the following results: for a frequency band of more than one octave (0.85 to 2.2GHz) the power density necessary varies +2.5 dB. Thus, the device, when adjusted for a power density of 1 mw/cm$^2$, provides lighting of the diode at 0.54 at a minimum and 1.77 at a maximum. This precision is such as to ensure to avoidance of dangerous exposure. The threshold for triggering the alarm signal is practically insensitive to temperature variations that occur within normal working conditions of personnel who whill be using the devices. The passband of the model depends, of course, on that of the antenna used and the shape of the antenna can be modified as desired, in accordance with conventional practice, to vary the passband.

It was noted during the tests referred to that movement of the model, which frequently occurs when the device is worn, will result in a variation in the light flash produced by the electroluminescent diode thereby causing a blinking effect which aids in attracting attention.

The operability of the device issued to an individual can be readily checked by placing the device in front of a standard source or, even more simply, in an area, such as an airfield, where power density is of a known calibration level.

It will be appreciated that the specific details of the embodiment described are merely exemplary and that, for example, a number of different materials other than cardboard can be used in fabricating cover 36, such as plastic, colored lacquer and the the like. Further, the luminous or visual alarm formed by the electroluminescent diode can be associated with a suitable audio alarm. Thus, it will be understood by those skilled in the art that although the invention has been described relative to a preferred embodiment, variations and modifications such as described, as well as others, can be effected in this embodiment without departing from the scope and spirit of the invention.

We claim:

1. An electromagnetic radiation detector including an alarm device, the improvement comprising a receiving antenna for detecting radiation, a voltage detector connected to said antenna, a threshold amplifier switch connected to the output of said voltage detector, and a suitably polarized electroluminescent diode, connected to the output of said amplifier switch, serving as said alarm device, said receiving antenna comprising a dipole antenna including radiation receiving dipole elements, the components of said detector including said dipole elements being formed on a printed circuit card, said card including a first hole for housing said DC source, and a second hole for mounting said diode, said components being carried by the back of said card and printed circuit connections for said components being located on the front of said card, the device further comprising a cover located on the front of said card including an aperture therein through which said diode extends, said cover for said card including identity and work identification indicia thereon.

2. In an electromagnetic radiation detector including an alarm device, the improvement comprising a receiving antenna for detecting radiation, a voltage detector connected to said antenna, a threshold amplifier switch connected to the output of said voltage detector, and a suitably polarized electroluminescent diode, connected to the output of said amplifier switch, serving as said alarm device, said receiving antenna comprising a dipole antenna, including radiation receiving dipole elements, the components of said detector including said dipole elements being formed on a printed circuit card, said card including a first hole for housing said DC source and a second hole for mounting said diode, said card being shaped as a badge capable of being worn or carried by a user, and said diode being located on said badge relatively near the upper end thereof to ensure visibility of the diode when the badge is carried in the pocket of a wearer.

3. An electromagnetic radiation detector as claimed in claim 2 wherein said badge includes identity indicia at a location on the front thereof above said diode and service instructions at location on the front thereof beneath said diode.

4. In an electromagnetic radiation detector including an alarm device, the improvement comprising a receiving antenna for detecting radiation, a voltage detector connected to said antenna, a threshold amplifier switch connected to the output of said voltage detector, and a suitably polarized electroluminescent diode, connected to the output of said amplifier switch, serving as said alarm device, said voltage detector comprising a rectifier bridge and said receiving antenna comprising a dipole antenna, the ends of one diagonal of said rectifier bridge being connected to the two radiation receiving elements of said dipole and the ends of the other diagonal being respectively connected to ground and to the input of said threshold amplifier switch, said threshold amplifier switch comprising a transistor connected in a common emitter configuration, a DC source being connected in series with said electroluminescent diode and the emitter-collector circuit of said transistor and the base of said transistor forming the input of said threshold amplifier switch, said electroluminescent diode being directly connected to said emitter-collector circuit of said transistor, the components of said detector including said dipole elements being formed on a printed circuit card, said card including a first hole for housing said DC source and a second hole for mounting said diode, said components being carried by the back of said card and printed connections for said components being located on the front of said card, said device further comprising a cover located on the front of said card and including an aperture therein through which said diode extends.

5. An electromagnetic radiation detector as claimed in claim 4 wherein said cover for said card includes identity and work identification indicia thereon.

6. In an electromagnetic radiation detector including an alarm device, the improvemment comprising a receiving antenna for detecting radiation, a voltage detector connected to said antenna, a threshold amplifier switch connected to the output of said voltage detector, and a suitably polarized electroluminescent diode, connected to the output of said amplifier switch, serving as said alarm device, said voltage detector comprising a rectifier bridge and said receiving antenna comprising a dipole antenna, the ends of one diagonal of said rectifier bridge being connected to the two radiation receiving elements of said dipole and the ends of the other diagonal being respectively connected to ground and to the input of said threshold amplifier switch, said threshold amplifier switch comprising a transistor connected in a common emitter configuration, a DC source being connected in series with said electroluminescent diode and the emitter-collector circuit of said transistor and the base of said transistor forming the input of said threshold amplifier switch, said electroluminescent diode being directly connected to said emitter-collector circuit of said transistor, the components of said detector including said dipole elements being formed on a printed circuit card, said card including a first hole for housing said DC source and a second hole for mounting said diode, said card being shaped as a badge capable of being worn or carried by a user, said diode being located on badge relatively near the the upper end thereof to ensure visibility of the diode when the badge is carried in the pocket of a wearer.

* * * * *